United States Patent
Rivera et al.

(10) Patent No.: US 8,572,909 B2
(45) Date of Patent: Nov. 5, 2013

(54) FLAT ROOF SOLAR RACKING SYSTEM

(75) Inventors: Angel M. Rivera, Newburgh, NY (US); Stanley E. Mayer, Middletown, NY (US)

(73) Assignee: Solar Mounting Solutions, LLC, Newburgh, NY (US)

(*) Notice: Subject to any disclaimer, the term of this patent is extended or adjusted under 35 U.S.C. 154(b) by 38 days.

(21) Appl. No.: 13/425,871

(22) Filed: Mar. 21, 2012

(65) Prior Publication Data
US 2012/0240489 A1    Sep. 27, 2012

Related U.S. Application Data

(60) Provisional application No. 61/467,245, filed on Mar. 24, 2011.

(51) Int. Cl.
    E04D 13/18        (2006.01)
    H01L 31/042       (2006.01)
(52) U.S. Cl.
    USPC ............. 52/173.3; 248/510; 136/251; 439/97
(58) Field of Classification Search
    USPC ................. 52/173.3; 248/500, 505, 510, 300; 136/244, 251; 126/704, 623; 439/97, 439/883, 444, 397, 927
    See application file for complete search history.

(56) References Cited

U.S. PATENT DOCUMENTS

| | | | |
|---|---|---|---|
| 3,486,158 A * | 12/1969 | Soltysik et al. | 439/92 |
| 4,226,256 A * | 10/1980 | Hawley | 136/244 |
| 4,406,505 A * | 9/1983 | Avramovich | 439/97 |
| 6,604,722 B1 * | 8/2003 | Tan | 248/276.1 |
| 6,809,251 B2 * | 10/2004 | Dinwoodie | 136/251 |
| 6,968,654 B2 * | 11/2005 | Moulder et al. | 52/173.3 |
| 7,435,897 B2 | 10/2008 | Russell | |
| 7,814,899 B1 | 10/2010 | Port | |
| 7,849,849 B2 | 12/2010 | Genschorek | |
| 7,921,843 B1 | 4/2011 | Rawlings | |
| 8,101,849 B2 * | 1/2012 | Almy et al. | 136/246 |
| 8,272,176 B2 * | 9/2012 | Wallgren | 52/173.3 |
| 8,424,255 B2 * | 4/2013 | Lenox et al. | 52/173.3 |
| 8,448,391 B2 * | 5/2013 | Botkin et al. | 52/173.3 |
| 8,464,496 B2 * | 6/2013 | Cusson et al. | 52/745.06 |

(Continued)

FOREIGN PATENT DOCUMENTS

JP    2009279824 A    * 12/2009

*Primary Examiner* — Brent W Herring
(74) *Attorney, Agent, or Firm* — Tracy Jong Law Firm; Tracy P. Jong; Cheng Ning Jong (57) ABSTRACT

A flat roof racking system configured for receiving solar panels having electrically conductive frames, the racking system comprising substantially parallelly disposed panel support structures, spacer bars and retaining and grounding clips pairs, each panel support structure comprises a first end, a second end, a top member having a first channel section connected to a second channel section and two ends, and a bottom member having a channel section and two ends. The first and second channel sections are disposed in a plane but at an angle from one another and each end of the bottom member is fixedly connected to an end of the top member such that the top member is configured to make a first tilt angle at the first end with the bottom member and a second tilt angle at the second end with the bottom member.

9 Claims, 7 Drawing Sheets

(56) References Cited

U.S. PATENT DOCUMENTS

| | | | |
|---|---|---|---|
| 2002/0033436 A1* | 3/2002 | Peng et al. | 248/284.1 |
| 2007/0144575 A1* | 6/2007 | Mascolo et al. | 136/246 |
| 2008/0067298 A1* | 3/2008 | Mossman et al. | 248/125.9 |
| 2008/0210221 A1* | 9/2008 | Genschorek | 126/704 |
| 2009/0256046 A1* | 10/2009 | Hausner et al. | 248/398 |
| 2010/0089390 A1* | 4/2010 | Miros et al. | 126/608 |

* cited by examiner

FLAT ROOF SOLAR RACKING SYSTEM

RELATED APPLICATIONS AND PRIORITY CLAIM

This application claims priority to provisional application U.S. Ser. No. 61/467,245 filed Mar. 24, 2011. Said application is incorporated by reference herein in its entirety.

BACKGROUND OF THE INVENTION

1. The Field of the Invention

The present invention is directed generally to a racking system for securing solar panels, and in particular, to a racking system for securing solar panels disposed on a flat roof.

2. Background Art

Recent advancements in solar cell technology and skyrocketing fossil fuel prices have prompted many businesses to consider solar energy as an alternative energy source. Many commercial buildings have flat roofs and most are left unused. These large expanses of flat spaces present ideal opportunities to place solar panels as they are typically not publicly accessible and free from significant natural debris such as leaves or shade cast by trees or buildings.

As labor costs are high, it is imperative that installers resort to solar racking systems having a grounding system that is simple to install, one that does not require highly trained professionals to be present at all times. For example, installation costs can be reduced if the electrician is only required to be present when solar panels are ready to be electrically enabled.

Solar panels and their supporting framework must be designed to be wind resistant. At least one prior art system has incorporated wind deflectors while another prior art system uses slides in the panel support structures to accommodate high wind velocities.

Given these concerns, several solar panel support systems have been designed to solve some of these problems. However, none of the prior art systems are designed to be capable of addressing all of these concerns.

U.S. Pat. No. 7,921,843 to Rawlings discloses a mounting system that is used to mount a solar panel array to a flat roof. The system utilizes mounting supports that hold solar panels at an incline. Each mounting support includes a first mounting ledge, a second mounting ledge, a flat base section and an inclined section that is disposed between the flat base section and the first mounting ledge. The first mounting ledge, second mounting ledge, flat base section and inclined section are all integrally formed from a common sheet of metal. A solar panel is attached between two of the mounting supports. Once mounted, the solar panel extends from the first mounting ledge of a first mounting support to a second mounting ledge of a second mounting support. Weights are then placed on the flat base section of the mounting supports to passively anchor the assembly to the roof. The spacing between rows of solar panels is not well established and therefore requires guesswork during installation. As the spacing is not well established, rows of solar panels may not be laid out optimally. The mounting system also does not allow solar panels to be installed all at once after mounting system has been fully erected. Such mounting system also prevents easy access to wiring of solar panels and cannot be disassembled easily for roof repair. The inclined section (32 of Rawlings) and side panels (39 of Rawlings) serve as wind shields to prevent wind from acting upon the underside of installed solar panels. Such mounting system lacks the consideration of air flow or circulation around the solar panels for cooling purposes. Charging efficiencies can be lowered during hot summer days due to the lack of cooling effects from air circulation in the space on the underside of the solar panels.

U.S. Pat. No. 7,849,849 to Genschorek discloses a frame assembly for mounting solar panels where the frame assembly comprises at least two flat frames which are arranged at a distance, preferably forming a triangle respectively with the frame sides thereof, respectively one frame side being inclined in relation to the surface of the ground or the roof. Carrier profiled parts that are used to support and fix a solar module are respectively arranged on two adjacent frames on the inclined side of the frame. The carrier profiled parts are used to ensure the connection to the adjacently arranged frame sides in such a way that they can be displaced and fixed in relation to each other. The frame sides are also connected in such a way that they can be displaced and fixed in relation to each other and/or comprise at least one length adjustment device. The spacing between rows of solar panels is also not well established and therefore requires guesswork during installation. Further, the spacing between solar panels is also not well established. As the spacing is not well established, solar panels may not be laid out optimally on a given surface area. Such mounting system is anchored to a roof, thereby requiring modification to the roof.

U.S. Pat. No. 7,814,899 to Port discloses in a first embodiment, a framed solar panel that is retained by a rod inserted through a hole in the panel frame. The rod is attached to the top of a bracket, which is mounted at its bottom to a substantially flat surface. In a second embodiment, a framed solar collector panel is retained by a clip which is designed to fit over the top edge of the frame. The clip is then attached to the top of a second bracket. In another embodiment, a tether is fastened between the through hole and the flat surface. These embodiments may be used at either or both ends of the frame. Each embodiment may include a safety tether that is connected between the frame and the bracket. This mounting system is also anchored to a roof, thereby requiring modification to the roof. In addition, it also requires adding a hole to each solar panel frame, thereby risking voiding the solar panels' manufacturer warranties.

U.S. Pat. No. 7,435,897 to Russell discloses rectangular solar panels that are mounted on a building roof by mounting stands that are distributed in rows and columns. Each stand comprises a base plate that rests on the building roof and first and second brackets of different height attached to opposite ends of the base plate. Each bracket has dual members for supporting two different solar panels, and each solar panel has a mounting pin adjacent to each of its four corners. Each panel is supported by attachment of two of its mounting pins to different first brackets, whereby the panels and their supporting stands are able to resist uplift forces resulting from high velocity winds without the base plates being physically attached to the supporting roof structure. The second brackets have a telescoping construction that permits their effective height to vary from less than to substantially the same as that of the first brackets. Judging from the parts disclosed, this mounting system appears to not be fully grounded as a rubber pad separates the mounting system from the roof and no grounding connections are observed to fully ground the mounting system. In addition, it also requires adding a hole to each solar panel frame, thereby risking voiding the solar panels' manufacturer warranties. Further, this mounting system incorporates moving parts to accommodate unusual wind forces which increase the need for periodic maintenance.

Thus, there arises a need for a solar panel racking system which is simple in construction and installation, one that does not require regular maintenance, one that provides superior grounding to conventional grounding methods and one that does not require modifications to existing flat roofs on which the racking system is used.

SUMMARY OF THE INVENTION

The present invention is directed toward a flat roof racking system configured for receiving a plurality of solar panels having electrically conductive frames. Each racking system comprises a plurality of substantially parallelly disposed panel support structures, a plurality of spacer bars and a plurality of retaining and grounding clips pairs.

Each panel support structure comprises a first end, a second end, a top member having a substantially rectilinear first channel section connected to a substantially rectilinear second channel section and two ends, and a bottom member having a channel section and two ends, wherein the first and second channel sections are disposed in a plane but at an angle from one another and each end of the bottom member is fixedly connected to an end of the top member such that the top member is configured to make a first tilt angle at the first end with the bottom member and a second tilt angle at the second end with the bottom member.

Each spacer bar has two ends that are each electrically conductive with a top member and connects two panel support structures disposed in parallel configuration.

Each retaining and grounding clips pair is configured to secure at least one frame of a solar panel and be electrically common with the frame of the solar panel.

The present racking system further comprises a plurality of wind deflectors. Each wind deflector has two ends, wherein each end is affixed to a first channel section of a panel support structure.

Accordingly, it is a primary object of the present invention to provide a solar panel racking system having light footprint (weight per area), simple to fabricate, simple to install and cost effective to acquire and maintain.

It is another object of the present invention to provide a solar panel racking system including a simplified and superior grounding system which is also combined with solar panel securing devices, such that the action for securing solar panels is also the action to ground the solar panels.

It is a further object of the present invention to provide a solar panel racking system which does not require modification to a flat roof on which it is disposed.

It is a further object of the present invention to provide a solar panel racking system which is corrosion resistant and requires little to no maintenance.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

The drawings are not to scale, in fact, some aspects have been emphasized for a better illustration and understanding of the written description.

PARTS LIST

2—solar panel array
3—grounding assembly
4—racking system
5—edge grounding assembly
6—panel support structure
8—northerly direction
10—southerly direction
11—vertical member
12—solar panel
14—flat roof
16—wind deflector
18—top member
20—bottom member
22—first channel section
24—second channel section
26—tie down bracket
28—solar panel tilt angle
30—wind deflector tilt angle
32—gap between wind deflector and solar panel 34—gap between wind deflector and flat roof
36—gap of panel support structure
38—spacer bar
40—ballast
42—retaining clip
44—edge retaining clip
46—grounding clip
48—edge grounding clip
50—rubber pad
52—drainage hole
54—height of gap 110
56—rivet
58—height of channel
60—width of channel
62—thickness of channels
64—Keps® nut or washer nut
66—combination of PEM® stud and plate where PEM® stud is mounted in plate
68—angle between first bank of teeth and main plate
70—rotatable plate
72—main plate
74—center hole of main plate
76—first bank of teeth
78—second bank of teeth
80—second teeth
82—tips of second teeth
84—angle between main plate and rotatable plate of grounding clip prior to clamp down
86—angle between rotatable plate and plane of second teeth
88—angle between tips of second teeth and plane of second teeth
90—width of main plate
92—length of main plate
94—unstressed height of grounding clip
96—flared edges of retaining clip
98—center hole of retaining clip
100—base of retaining clip
102—thickness of grounding clip
104—aperture in top member for receiving screw or stud
106—second channel section of top member
108—angle between top member and plane of second teeth
110—gap due to solar panel being elevated
112—inflection line between rotatable plate and second teeth
114—angle between main plate and rotatable plate of grounding clip upon applying clamp down force
116—first end of panel support structure
118—second end of panel support structure
120—base of channel
122—length of bottom member
124—spacing between consecutive rows of panel support structures
126—height of wind deflector
128—height of gap 34
130—lip of wind deflector Particular Advantages of the Invention The present racking system provides light footprint on roofs, i.e., about 3.5 lbs. per sq. ft (17.1 Kg per sq. m) to roof load while a conventional racking system can add up to 5 lbs. per sq. ft (24.4 Kg per sq. m). The present racking system utilizes optimal panel support structures which provide sufficient strength to support solar panels while not requiring significantly higher weight in return for stability. A wind deflector is affixed to each pair of panel support structures to reduce strong winds or air flows from entering the space beneath mounted solar panels while leaving sufficient gaps between the wind deflector and the mounted solar panel, below the wind deflector, below the mounted solar panel and between the top and bottom members to enable cooler air to be drawn in under the solar panel to prevent excessive heat buildup in this space during hot summer days, overheating of the solar panels and lowering of the solar panels' electricity output. This reduction in temperature helps the solar panel to be more effective in generating electricity.

The wind deflector is disposed above the top edge of the solar panel to prevent entry of wind gusts and lifting of the solar panel as they tend to travel level with the ground or the flat roof surface. The panel support structures are mechanically tied together using tie down brackets to further secure the racking system against wind lifting. As provision is made to reduce wind lifting, the present ballast requirement is lowered, thereby enabling the application of the present racking system on flat roofs which are not suitable for higher weight density. The same provision also reduces ballast materials, thereby reducing costs and labor for installing the materials.

The present racking system provides superior corrosion resistance afforded by powder coat over Galvalume®. Galvalume® is the tradename for 55% aluminum-zinc alloy coated sheet steel. The additional powder coat deposited atop the Galvalume® layer further protects the racking system by making it more difficult for the steel substrate underneath the two layers of protection to be exposed to environmental elements.

Further, no modifications are required of the present racking system or the flat roof on which the racking system is disposed. In order to secure solar panels and their supporting structures, ballasts or weights are used and disposed within bottom members, making the panel support structures more compact and eliminating the use of additional materials used such as the flat bottom sections (26 of Rawlings).

The present racking system can be assembled quickly by installers as spacer bars are used to set precise spacing between panel support structures. With precise spacing, solar panels can be installed after all racking is complete. Electricians are therefore not required on site until all mechanical assembly is complete. Installation efficiency is therefore realized. Portions of the present racking system can be factory preassembled to ease onsite assembly. In addition, portions of the present racking system can be easily disassembled for roof repairs. Further, easy access to wiring of solar panels is provided with the present racking system. The present racking system is constructed and fully grounded for electrical code compliance such as with Underwriters Laboratories, Inc. (UL) on UL2703. The present racking system does not cause discoloration of white roof membranes as rust is prevented with powder coat of the racking system over Galvalume® coated steel. Membrane roofing is a type of roofing system for buildings. It is typically used on flat or nearly flat roofs to prevent leaks and move water off the roof. Further, suitable roof drainage is provided as the racking system does not collect rainwater as rainwater can freely flow underneath the racking system. Drainage holes are provided in bottom members of the panel support structures. Rubber pads are provided on bottom of bottom members of the panel support structures to raise the coefficient of friction of the racking system relative to flat roofs on which it is disposed, prevent skidding of the racking system over the flat roofs and to promote drainage underneath the bottom members.

DETAILED DESCRIPTION OF A PREFERRED EMBODIMENT

As used herein, the terms "grounding" or "ground" shall be construed to mean electrically grounding ("ground") an object or bonding the object to a ground potential. As used herein, the term "bonding" means permanently joining to form an electrically conductive path that ensures electrical continuity and that the formed bond has the capacity to safely conduct any current likely to be imposed. The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower).

Figure 1:
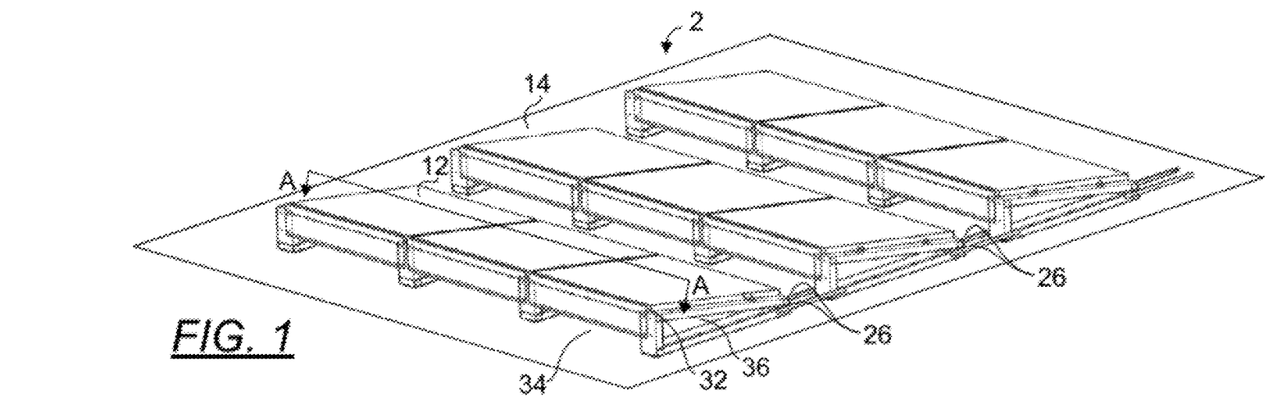
FIG. 1 is a top front perspective view of a solar panel array disposed on a flat roof utilizing the present racking system.
Figure 2:
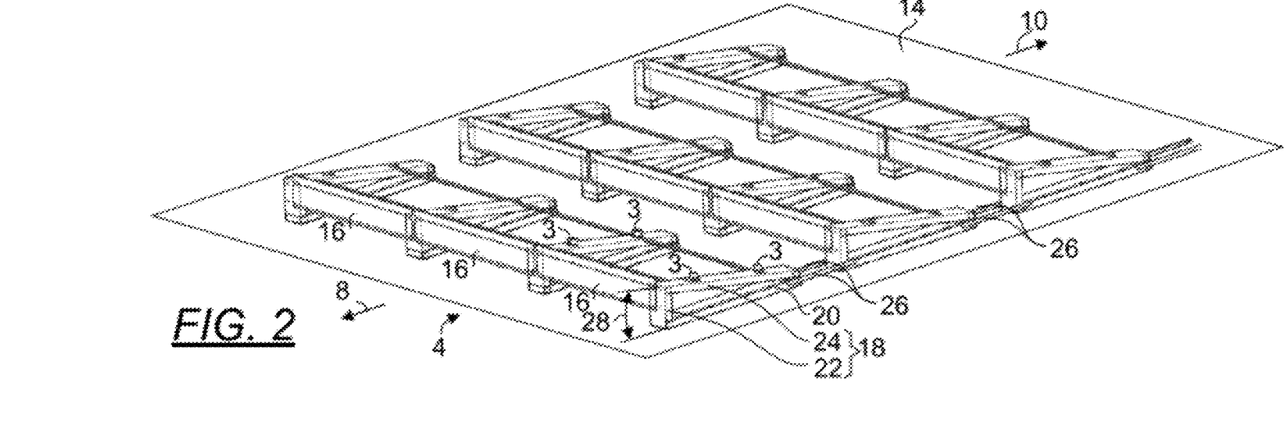
FIG. 2 is a top front perspective view of the present racking system without installed solar panels.
Figure 3:
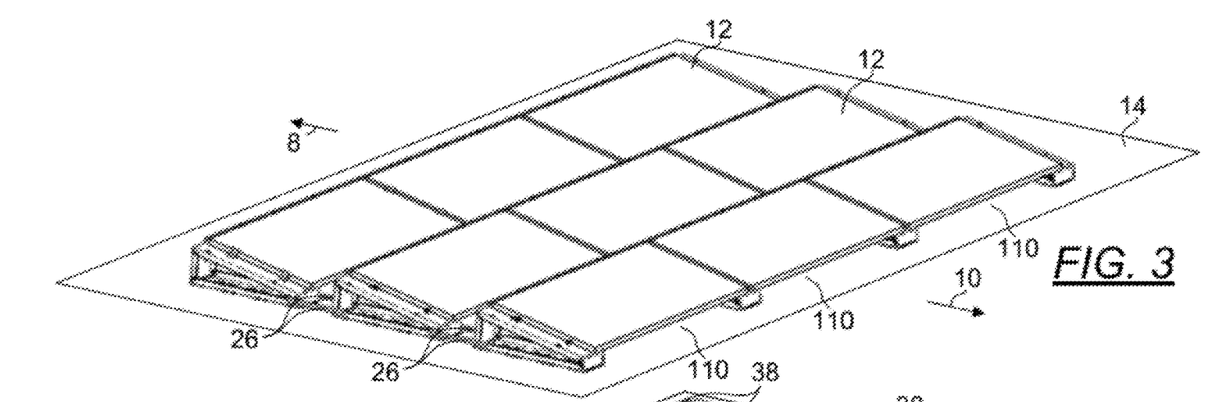
FIG. 3 is a top rear perspective view of a solar panel array disposed on a flat roof utilizing the present racking system.
Figure 4:
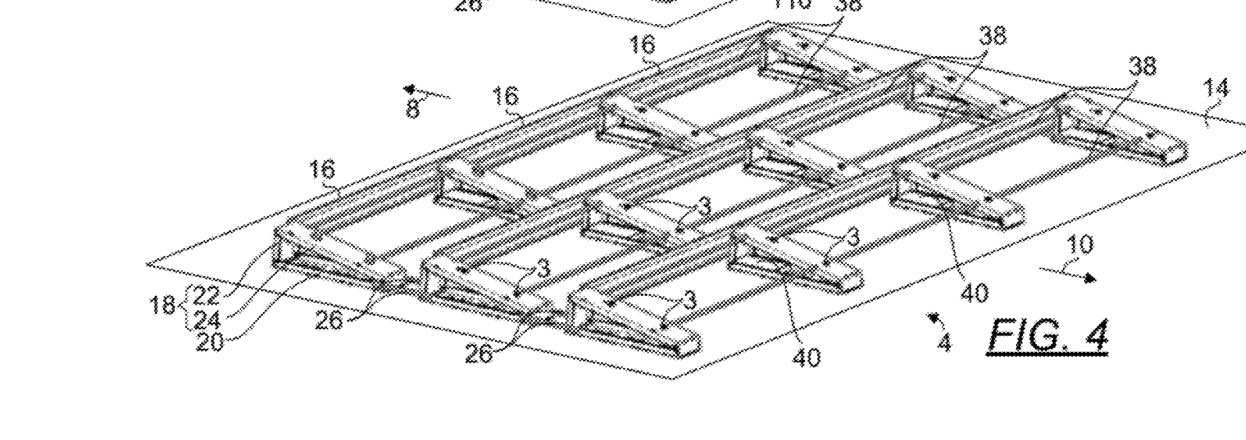
FIG. 4 is a top rear perspective view of the present racking system without installed solar panels.
Figure 5:
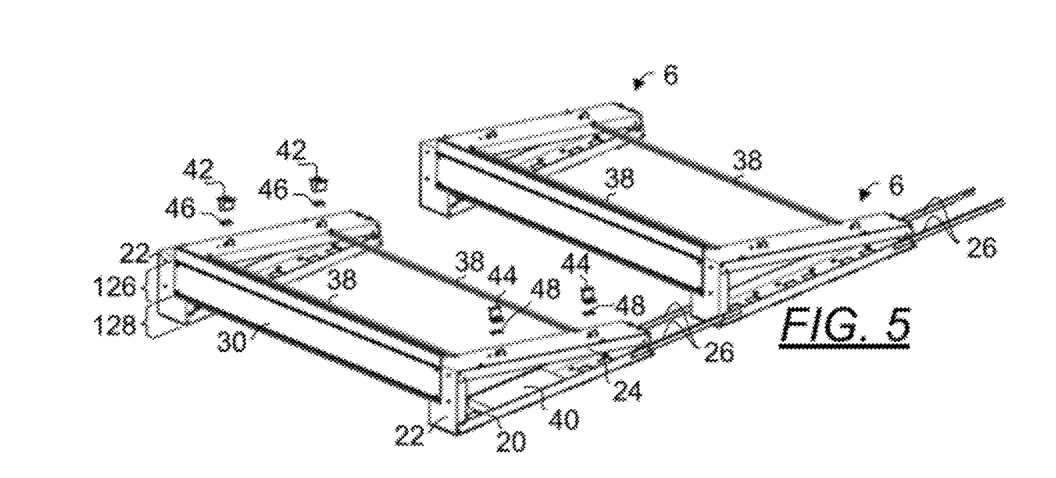
FIG. 5 is a top front perspective view of a portion of a racking system according to the present invention.

FIG. 1 is a top front perspective view of a solar panel array 2 disposed on a flat roof 14 utilizing the present racking system 4. FIG. 2 is a top front perspective view of the present racking system 4 without installed solar panels 12. FIG. 3 is a top rear perspective view of a solar panel array 2 disposed on a flat roof 14 utilizing the present racking system 4. FIG. 4 is a top rear perspective view of the present racking system 4 without installed solar panels 12. FIG. 5 is a top front perspective view of a portion of a racking system 4 according to the present invention. The present racking system 4 is configured for receiving a plurality of solar panels 12, each having an electrically conductive frame, on a flat roof 14. The racking system 4 comprises a plurality of support structures 6 where each panel support structure 6 comprises a first end, a second end, a top member 18 having a substantially rectilinear first channel section 22 connected to a substantially rectilinear second channel section 24 and two ends, and a bottom member 20 having a channel section and two ends 116, 118.

In order to further secure the racking system 4, tie down brackets 26 are used to secure panel support structures 6 of two consecutive rows. A tie down bracket 26 is essentially a straight bracket with one or more holes disposed on each end of the tie down bracket 26. During installation, one end of a tie down bracket 26 is affixed to the second end of a panel support structure 6 while the other end is affixed to the first end of an adjacent panel support structure 6 on an adjacent row. In a preferred embodiment, a pair of tie down brackets 26 is used to secure two adjacent panel support structures 6 such that sufficient spacing 124 between two rows of panel support structures 6 is provided as a pathway for installation and maintenance crew. It is also important to dispose two adjacent rows of panel support structures 6 at sufficient spacing to prevent a row of solar panels from casting shadow on its adjacent row of solar panels.

The first and second channel sections 22, 24 are disposed in a plane but at an angle from one another and each end of the bottom member 20 is fixedly connected to an end of the top member such that the top member 18 is configured to make a wind deflector tilt angle 30 at the first end 116 with the bottom member 20 and a solar panel tilt angle 28 at the second end 118 with the bottom member 20. In one embodiment, the wind deflector tilt angle 30 configured for mounting a wind deflector 16 ranges from about 75 to about 85 degrees while the solar panel tilt angle 28 configured for mounting a solar panel 12 ranges from about 15 to about 5 degrees. In the embodiment shown, a vertical member 11 is added at the second end 118 of each panel support structure 6, connecting the top member 18 to the bottom member 20. In one aspect, the vertical member 11 is a channel where its walls at its two ends are riveted to the top and bottom members 18, 20. Such connection elevates the panel support structure 6 at the second end to create gap 110 and improves air flow or circulation under the solar panel 12. The vertical member 11 may also be fabricated integrally with either the top or bottom 18, 20 member. In another embodiment, the vertical member 11 may be eliminated to minimize or eliminate gap 110 in more moderate climates.

Each top member 18 may be fabricated from a single channel or two separate channels. In a single channel construction, a transverse cut is first made to the sides of the channel. A wall on one side of the cut is slightly bent inwardly or outwardly such that it will overlap with the unbent wall when the base of channel is bent substantially transversely at the cut. The channel now becomes two sections, i.e., the first channel section 22 and the second channel section 24 meeting at the bend. Non-corrosive rivets 56, screws-nuts, bolts-nuts and other fastening devices may be used to affix the overlapped walls. In another example, the first and second channel sections 22, 24 are channels cut to suitable lengths to form discrete pieces which are then fastened together to form the top member 18 using appropriate fastening devices previously disclosed or welded together.

In one preferred embodiment, two spacer bars 38 are disposed across each set of panel support structures 6. Each spacer bar 38 has two ends that are each electrically conductive with one of the two top members 18. One spacer bar 38 is disposed with each end in the vicinity of one end of a second channel section 24. Each spacer bar 38 is disposed at substantially right angle to the two panel support structures 6. In one embodiment, each spacer bar 38 is secured at each end using conventional fasteners such as screw and nut, rivets, etc. A second spacer bar 38 is configured to connect the two panel support structures 6 at substantially right angle but at a location substantially closer to the second end 118. Solar panel installation is carried out on-site since it is impractical to pre-install various components in the factory. It therefore is imperative to provide components which facilitate on-site installation. A spacer bar 38 is provided to ensure that the spacing between two consecutive top members 18 is within geometric tolerance for mounting a solar panel 12 in addition to providing strength to the racking system 4. During installation, a spacer bar 38 is first positioned across two top members 18 such that each of its ends is spatially and electrically engaged with a portion of a top member 18. Electrical bonding of the spacer bar 38 to a top member 18 (and as a result electrical bonding between a top member 18 to an adjacent top member 18) is enabled or enhanced by avoiding application of paint or any types of electrical insulator on each end of the spacer bar 38. In one embodiment, spatial engagement of the space bar 38 to a top member 18 is enabled or enhanced by providing suitable slots or cuts in the top member 18 for receiving an end portion of the spacer bar 38.

The present racking system 4 further comprises a plurality of wind deflectors 16. Each wind deflector 16 is essentially a planar plate having two ends where each end is affixed to a first channel section 22. The wind deflector 16 terminates at its upper edge in a lip 130 facing a solar panel 12. Gap 32 is disposed between the wind deflector 16 and solar panel 12. In contrast to the wind deflector of U.S. Pat. No. 7,921,843 to Rawlings, the present wind deflector is configured such that it eliminates wind lift but yet allows for air flow or circulation under the installed solar panels 12. If not configured properly, wind gusts which can enter the space formed under the solar panel 12 to potentially lift and damage the racking system 4 and the solar panels.

Rawlings discloses the use of wind deflectors but fails to contemplate heat dissipation from solar panels. Gap 34 is disposed underneath the wind deflector 16 while gap 110 is disposed underneath the south end of the solar panel 12. The gaps 32, 34, 36 and 110 are especially effective during hot summer days as reduction in temperature helps the solar panels 12 to be more effective in generating electricity. Frequently, air is drawn through gaps 34, 36 and 110 and flows upwardly towards gap 32 as warmer air rises, bringing with it the heat dissipated from the flat roof 14 or travels through the flat roof 14 from the ceiling of the building. Environmental factors can be especially important in northern climates as snow can often accumulate atop and between solar panels for extended periods of time. These gaps 32, 34, 36, 110 encourage draining of snow and rainwater runoffs such that snow will become less likely to collect atop the solar panels 12 which can severely reduce the effectiveness of the solar panels 12 in generating electricity. In one embodiment, the wind deflector 16 is configured such that its height 126 (as measured orthogonally to wind deflector 16) is about twice the height 128 of gap 34 (as measured orthogonally to gap 34). This ratio defines the air flow rate entering gap 34 for cooling a solar panel 12 versus the air flow rate flowing over the wind deflector 16 to exert a downwardly acting force on the racking system 4. Recent wind tunnel tests performed by Applicants revealed the importance of using wind deflectors 16 to prevent lift. In one embodiment, the height 54 of gap 110 measures about 4.2 inches (10.7 cm) while the height 128 of gap 34 measures about 4.3 inches (10.9 cm).

During installation, the first end 116 of each panel support structure 6 is disposed at the northerly direction 8 with respect to the second end 118 such that upon installation, the solar panels are tilted toward the sun for maximum energy absorption throughout the day. The present racking system 4 provides superior corrosion resistance afforded by powder coat over Galvalume®. Galvalume® is the tradename for 55% aluminum-zinc alloy coated sheet steel. The additional powder coat deposited atop the Galvalume® layer further protects the racking system including the panel support structures 6, spacer bars 38 and wind deflectors 16 by making it more difficult for the steel substrate underneath the two layers of protection to be exposed to environmental elements. As used herein and in one aspect, the powder can be a thermoplastic or a thermoset polymer. In one embodiment, the powder is polyester.

Figure 6:
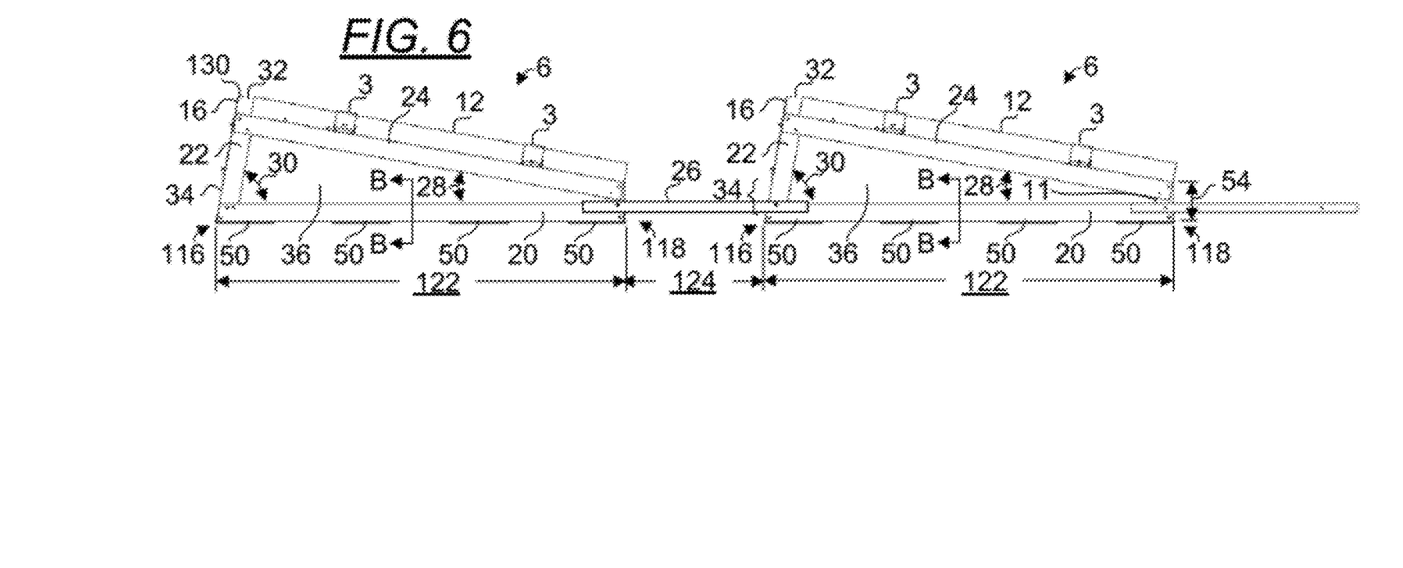
FIG. 6 is a side orthogonal view of the embodiment shown in FIG. 5.

FIG. 6 is a side orthogonal view of the embodiment shown in FIG. 5. Each solar panel 12 is affixed and grounded by at least two retaining and grounding clips pairs 42, 46, one on each panel support structure 6. In one preferred embodiment as shown, two retaining and grounding clips pairs 42, 46 are disposed on each panel support structure 6 wherein each retaining and grounding clips pair 42, 46 is configured to secure a solar panel 12 frame and be electrically common with it. On a panel support structure 6 bordering a row, each retaining and grounding clips pair 42, 46 is replaced with an edge retaining clip and edge grounding clips pair 44, 48. Each retaining and grounding clips pair is essentially the same as a retaining and grounding clips pair 42, 46 with the exception that the edge grounding clip 48 lacks a second bank of teeth 78 and the edge retaining clip 44 lacks a flared edge 96 as the edge retaining and grounding clips pair 44, 48 needs only secure one solar panel 12. In one embodiment, the length 122 of a bottom member 20 measures about 40 inches (1.02 m). An exemplary suitable solar panel for the present racking system 4 measures about 39 inches (0.99 m) by 64.25 inches (1.63 m) by 2 inches (5.1 cm).

Figure 7:
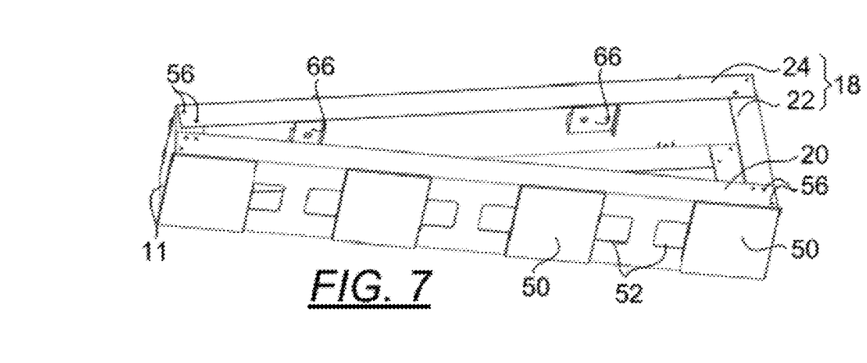
FIG. 7 is a bottom rear perspective view of a panel support structure according to the present racking system.

FIG. 7 is a bottom perspective view of a panel support structure 6 depicting the use of plates of the PEM® stud and plate combination 66 in one embodiment of the present grounding assembly to further clarify the use of such devices to secure a retaining and grounding clips pair 42, 46 or an edge retaining and grounding clips pair 44, 48. Each bottom member 20 comprises a plurality of drainage holes 52 disposed on its base to enable drainage of environmental elements such as rainwater, snow, etc. Therefore, while providing a simple, stable base of lower center of gravity to the panel support structure 6, the bottom member 20 is simple to maintain. Preferably, a plurality of rubber pads 50 are disposed on the bottom of the bottom member 20 to prevent skidding of the racking system 4 atop a flat roof 14, especially during the installation of the racking system 4, i.e., before additional weight (such as from solar panels and ballasts) is put atop the bottom members 20. The rubber pads 50 may be simply laid out on the flat roof 14 before seating a panel support structure 6 over them or the rubber pads 50 have been attached to the bottom of the bottom member 20 with weather resistant adhesives.

Figure 8:
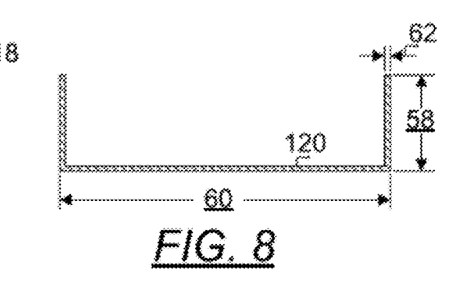
FIG. 8 is a cross-sectional profile of the top or bottom members of the present racking system.

FIG. 8 is a cross-sectional profile of the top and bottom members 18, 20 of the present racking system 4. In one embodiment, the width 60 of the channel is about 8.2 inches (20.8 cm) while the height 58 of the channel is about 1.88 inches (4.8 cm). The width 60 is configured sufficiently wide to accommodate ballasts 40 disposed on the base 120 of a channel. A ballast 40 provides additional weight for weighing down a panel support structure 6 to prevent inadvertent lifting of installed solar panels 12 by wind forces. Examples of ballasts 40 are concrete blocks or bricks, sand or water-filled containers and the like. In one embodiment, each ballast 40 weighs in at about 14.5 lbs (6.6 kg). A compact racking system 4 footprint is provided by disposing each ballast 40 within a channel as the bottom member 20 is already utilized as a part of a panel support structure 6. Disposing the ballast 40 within the bottom member 20 does not add additional footprint to the racking system 4.

Figure 9:
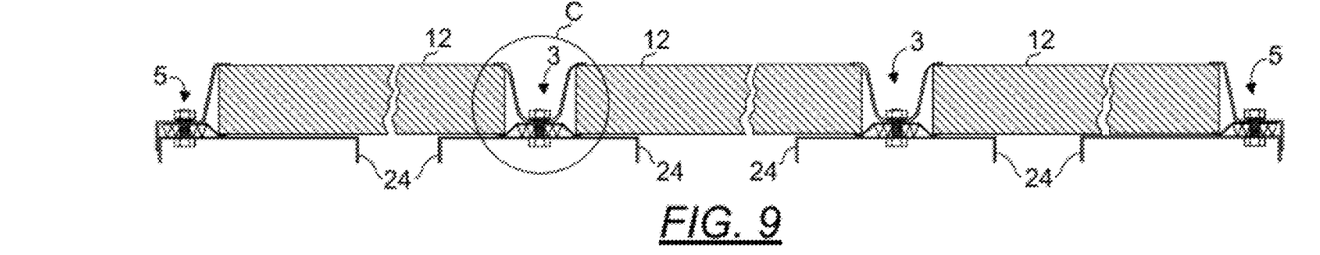
FIG. 9 is a front orthogonal partial sectional view of a plurality of installed solar panels as taken along line A-A of FIG. 1, depicting a means by which the solar panels are mounted according to the present invention.

FIG. 9 is a front orthogonal sectional view of a plurality of installed solar panels 12 as taken along line A-A of FIG. 1, depicting a means by which the solar panels 12 are mounted according to the present invention. Each grounding assembly 3 aids in securing and grounding two solar panels 12 while each edge grounding assembly 5 aids in securing and grounding one edge disposed solar panel 12. Applicants further discovered that by incorporating a grounding clip 46 with a retaining clip to form a grounding assembly 3 or edge grounding assembly 5, ground wiring of conventional methods and therefore requisite securing hardware can be eliminated. Each solar panel 12 is secured to each top member 18 at two spots by either two grounding assemblies 3 or two edge grounding assemblies 5.

FIGS. 10, 11, 12 and 13 are top perspective, front orthogonal, top plan and side orthogonal view, respectively, of another embodiment of a grounding clip 46 according to the present invention. The second banks of teeth are further bent upwardly to form bent tips 82 that are disposed in a plane at a fourth angle 88 of about 25 degrees with respect to the plane of the second teeth 80. In one embodiment, the main plate 72 measures about 1.5 inches (38 mm) in length 92 and about 1.1 inches (28 mm) in width 90. In its unstressed condition, the grounding clip 46 measures about 0.27 inch (7 mm) in height 94.

Each grounding clip 46 comprises a planar body or main plate 72 disposed in a plane and a pair of opposingly disposed first banks of teeth 76, each first bank of teeth is disposed in a plane and extending downwardly and outwardly from the main plate 72 at a first angle with respect to the main plate 72. Each grounding clip 46 further comprises a pair of opposingly disposed second banks of teeth, where each second bank of teeth 78 comprises a rotatable plate 70 disposed in a plane and at a second angle with respect to the main plate 72 and extending downwardly and outwardly from the main plate 72 and terminating in a plurality of second teeth disposed upwardly in a plane and at a third angle with respect to the rotatable plate 70. In use, a grounding clip 46 is interposed between two solar panels 12 and a top member 18 of a panel support structure 6 such that each first bank of teeth faces the top member 18 and when a force is applied substantially perpendicularly to the plane of the main plate 72, each second bank of teeth is adapted to rotate outwardly from the main plate 72 and causes electrical grounding with the solar panels 12.

Figure 10:
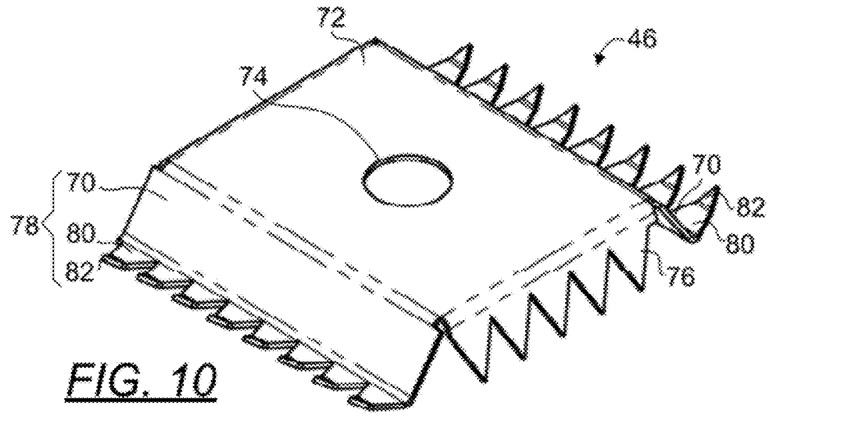
FIG. 10 is a top perspective view of one embodiment of a grounding clip according to the present invention.
Figure 11:
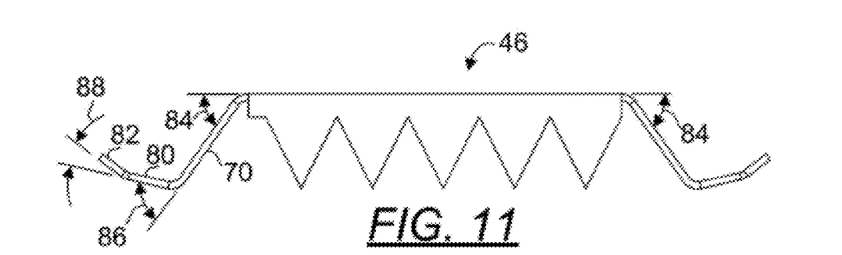
FIG. 11 is a front orthogonal view of the embodiment of grounding clip disclosed in FIG. 10.
Figure 12:
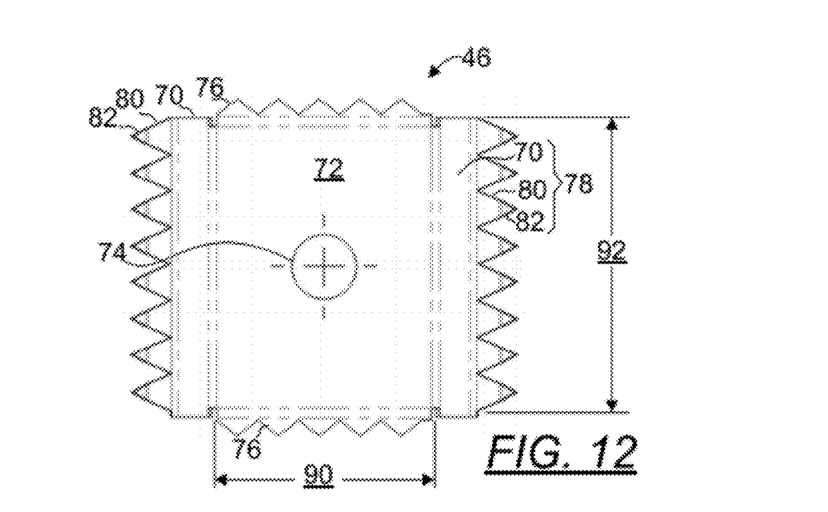
FIG. 12 is a top plan view of the embodiment of grounding clip disclosed in FIG. 10.
Figure 13:
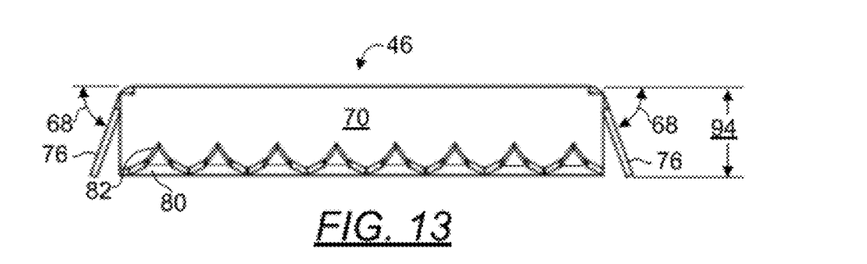
FIG. 13 is a side orthogonal view of the embodiment of grounding clip disclosed in FIG. 10.
Figure 14:
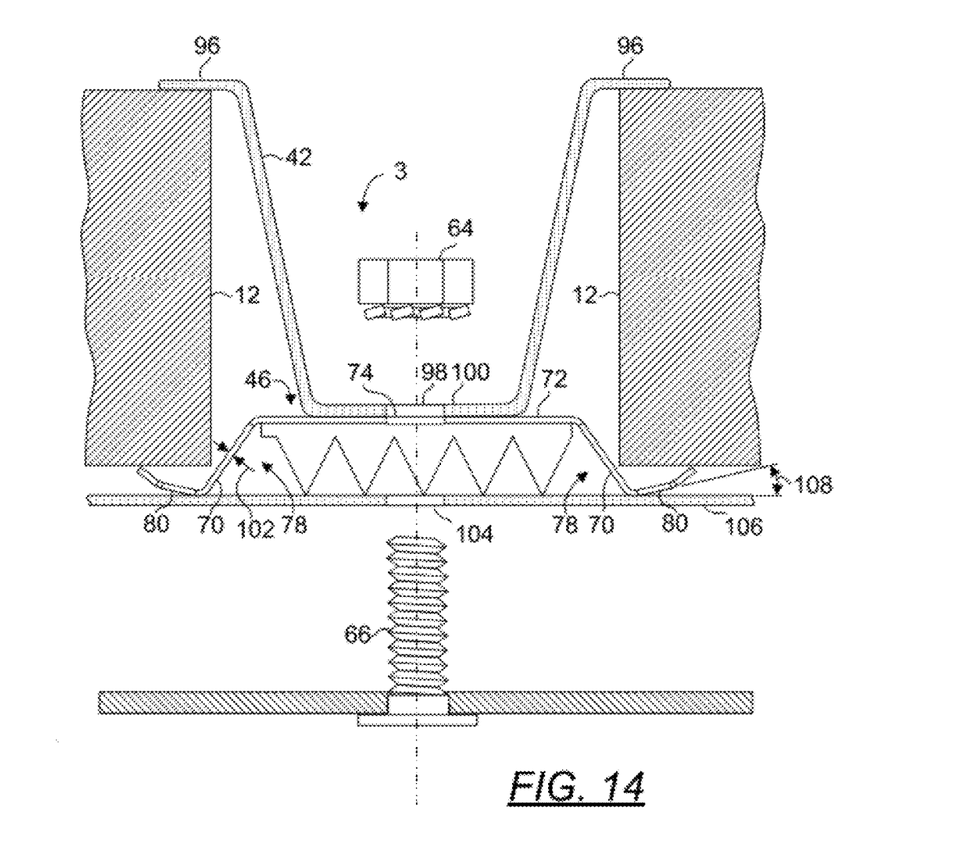
FIG. 14 is a front orthogonal partial cross-sectional view of a grounding assembly using the grounding clip of FIG. 10, but depicting the arrangement of a pre-assembled grounding assembly.

FIG. 14 is a front orthogonal partial cross-sectional view of a grounding assembly 3 using the grounding clip 46 of FIG. 10, but depicting the arrangement of a pre-assembled grounding assembly. During the construction of the top member 18, a hole 104 is disposed in the second channel section 106 of the top member 18 to enable penetration of the stud of the combination of PEM® stud and plate through the hole. The stud of a PEM® stud and plate combination 66 is inserted from the bottom of the second channel section 106 of the top member 18 through aperture 104, center hole 74 of the grounding clip 46 and center hole 98 of the retaining clip 42 to engage a Keps® nut 64. In another embodiment, a nut-friction washer combination may be used instead of the Keps® nut 64 and a screw or a discrete screw and plate combination may be used instead of the PEM® stud and plate combination. The stud is preferably affixed to the top member 18 by friction fit. In other embodiments, the stud may also be affixed to the top member 18 by brazing, soldering or spot welding. Affixing the stud to the top member 18 simplifies installation and grounding of solar panels 12 as access to the bottom of the top member 18 (for securing the stud) will not be necessary. It shall be noted that, in addition to providing grounding, the present grounding clip 46 provides a means for securing a solar panel as penetrations afforded by the first and second banks of teeth 76, 78 into the top member 18 and solar panels 12 prevent relative movement of these components. When disposed atop the second channel section 106 of the top member 18, the plane of the second teeth is disposed at an angle 108 of about 12 degrees with respect to the second channel section 106 of the top member 18.

Figure 15:
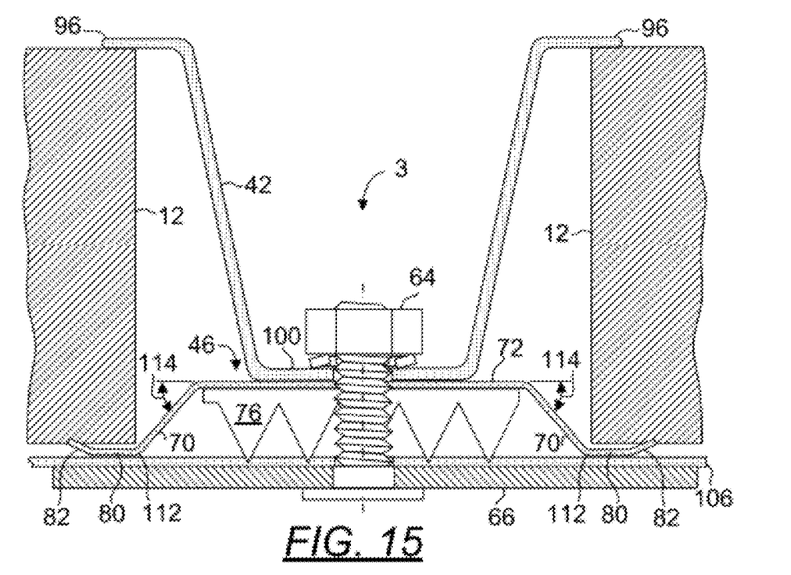
FIG. 15 is a front close-up partial cross-sectional view of a grounding assembly using the grounding clip of FIG. 10.

FIG. 15 is a front close-up partial cross-sectional view of a grounding assembly 3 as taken from C of FIG. 9 with the grounding clip fastening system, i.e., Keps® nut 64 and the combination of PEM® stud and plate 66 mated and tightened. It shall be noted that at this position, the plurality of second teeth 80 are disposed substantially parallel to the second channel section 106 of the top member 18. As the Keps® nut 64 is tightened, the first banks of teeth 76 penetrate and electrically bond with a top surface of the second channel section 106 while the rotatable plate 70 presses against and rotates outwardly with respect to the main plate 72. This rotation or flexing motion of the rotatable plate 70 causes the bent tips 82 to penetrate or bite through an anodized layer of a bottom portion of a solar panel 12 to create electrical bond. Applicants discovered that the plate of the PEM® stud and plate combination 66 adequately distributes the load exerted on aperture 104 and its surrounding to avoid point loading that can cause failure of the fastening system 64, 66 resulting from deformation due to high stresses in the top member 18. A failure in aperture 104 can also cause insufficient compression in the grounding clip 46 to create proper bond with the solar panels 12 and second channel section 106 of the top member 18.

The grounding clip 46 is configured to cooperate with a retaining clip 42 to secure and ground the two solar panels 12. The retaining clip 42 comprises a channel having a base 100 and two flared edges 96. The retaining clip 42 is affixed at the base 100 to the main plate 72 to form two clamps where each clamp is defined by one of the two flared edges 96 and a second bank of teeth 78 and configured to secure one of the solar panels 12.

The grounding clip 46 is disposed with the pair of first banks of teeth 76 facing the top member 18 and when the fastening system 64, 66 is tightened, each inflection line 112 between a rotatable plate 70 and second teeth 80 contacts a top member 18 causing the rotatable plate 70 to rotate outwardly and the second teeth to penetrate or bite through an anodized layer of a bottom portion of a solar panel 12 to cause electrical grounding and the pair of first banks of teeth is adapted to penetrate and cause electrical grounding with the top member 18.

Figure 16:
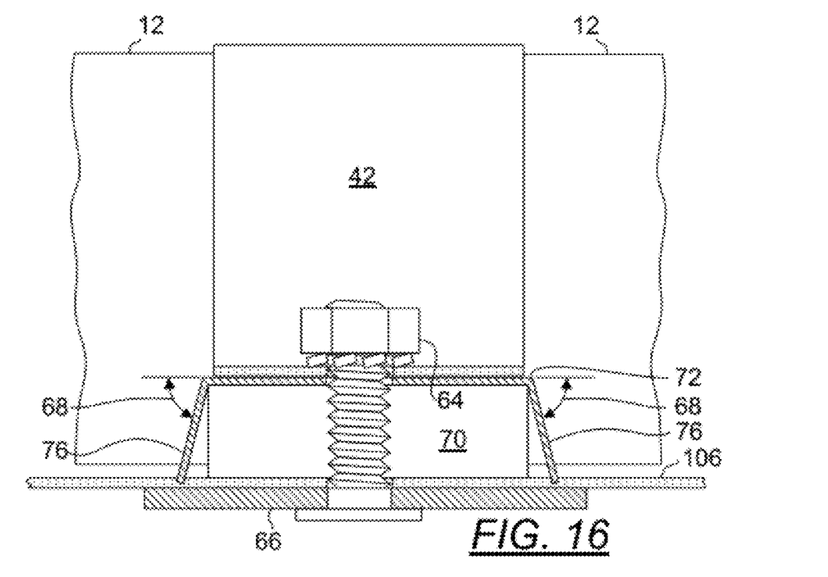
FIG. 16 is a side orthogonal partial cross-sectional view of a grounding clip as taken from C of FIG. 9 with the grounding clip fastening system tightened.

FIG. 16 is a side orthogonal partial cross-sectional view of a grounding clip 46 as taken from C of FIG. 9 with the grounding clip fastening system installed. Each first bank of teeth 76 comprises a plurality of first teeth disposed in a plane and extending downwardly and outwardly from one of the two first opposing edges, wherein the plane of the plurality of first teeth are disposed at a first angle 68 with respect to the main plate 72.

The top, bottom and vertical members 18, 20, 11 are made of steel and in one embodiment, their thickness 62 is 0.036 inch (0.9 mm). As the first and second teeth cut into the second channel section 106 of the top member 18, they form an air-tight connection which maintains good electrical connection over time. In each grounding assembly 3, 5, there are eight grounding contact areas between a solar panel 12 and the grounding assembly 3, 5 and there are ten contact areas between the grounding assembly 3, 5 and the top member 18. As these contact areas are sufficiently large, they provide superior grounding over conventional grounding devices in addition to simplifying grounding design over conventional grounding devices.

In one embodiment, the second angle (in an unstressed condition 84) measures about 55 degrees. The third angle (in an unstressed condition 86) measures about 67 degrees. As Keps® nut 64 is tightened, the rotatable plate 70 rotates with respect to the main plate 72 such that the rotatable plate 70 is now disposed at a shallower angle 114 of about 50 degrees to cause the second teeth 80 to penetrate a bottom wall of a solar panel 12 to establish electrical contact with the solar panel 12.

In one embodiment, the present grounding clip 46 is constructed from a stainless steel sheet. A blank is stamped out from the metal sheet. The metal sheet preferably measures a thickness 102 of about 0.02 inch (0.5 mm). Two opposing edges are first bent to form the downwardly extending pair of first banks of teeth 76. Two remaining opposing edges are then bent to form the rotatable plates 70 of the pair of second banks of teeth 78. Each of the rotatable plates 70 is then further bent to form the plurality of second teeth whose plane is disposed at a third angle to the rotatable plate 70. In one embodiment, the plurality of second teeth are further bent to form the bent tips 82 disposed in a plane at a fourth angle with respect to a plane corresponding to the plurality of second teeth 80.

Therefore, each grounding clip 46 is formed by: (1) stamping a blank from a metal sheet and (2) performing the bending steps either as a single step or a series of steps. In another embodiment, the two steps disclosed above are combined in a single step of stamping a blank from a metal sheet and stamping the blank in a mold to form the necessary pairs of banks of teeth.

We claim:

1. A flat roof solar racking system configured for receiving at least one solar panel having an electrically conductive frame, said racking system comprising:

(a) at least two substantially parallelly disposed panel support structures, wherein each panel support structure comprises:
a first end, a second end, a top member having a substantially rectilinear first channel section connected to a substantially rectilinear second channel section and two ends, and a bottom member having a channel section and two ends, wherein said first and second channel sections are disposed in a plane but at an angle from one another and each end of said bottom member is fixedly connected to an end of said top member such that said top member is configured to make a first tilt angle at said first end with said bottom member and a second tilt angle at said second end with said bottom member; and
(b) at least two spacer bars, wherein each spacer bar has two ends, each end electrically conductive with one of said at least two top members and each spacer bar is configured to connect said at least two top members; and
(c) at least two retaining and grounding clips pairs, wherein each retaining and grounding clips pair is configured to secure a frame of said plurality of solar panels and be electrically common with said frame of said at least one solar panel and each grounding clip of said at least two retaining and grounding clips pairs comprises:
(i) a planar body disposed in a plane;
(ii) a pair of opposingly disposed first banks of teeth, each first bank of teeth is disposed in a plane and extending downwardly and outwardly from said planar body at a first angle with respect to said planar body; and
(iii) a pair of opposingly disposed second banks of teeth, each second bank of teeth comprises a rotatable plate disposed in a plane and at a second angle with respect to said planar body and extending downwardly and outwardly from said planar body and terminating in a plurality of second teeth disposed upwardly in a plane and at a third angle with respect to said rotatable plate,
wherein said grounding clip is interposed between said at least one solar panel and a top member of said at least two panel support structures such that each of said pair of first banks of teeth faces said top member of said at least two panel support structures and when a force is applied substantially perpendicularly to said plane of said planar body, at least one of said pair of second banks of teeth is adapted to rotate outwardly from said planar body and cause electrical grounding with said at least one solar panel.

2. The flat roof solar racking system of claim 1, further comprising at least one ballast disposed atop each said bottom member.

3. The flat roof solar racking system of claim 1, further comprising at least one wind deflector having two ends, wherein each end of said at least one wind deflector is affixed to one of said first channel sections of said at least two panel support structures.

4. The flat roof solar racking system of claim 3, wherein said at least two panel support structures, said at least two spacer bars and said at least one wind deflector are constructed from steel coated with aluminum-zinc alloy and powder coated.

5. The flat roof solar racking system of claim 1, wherein said first end of said at least two panel support structures is disposed at a northerly location with respect to said second end of said at least two panel support structures.

6. The flat roof solar racking system of claim 1, wherein said first tilt angle ranges from about 75 to about 85 degrees.

7. The flat roof solar racking system of claim 1, wherein said second tilt angle ranges from about 15 to about 5 degrees.

8. The flat roof solar racking system of claim 1, wherein each said bottom member further comprises a plurality of drainage holes.

9. The flat roof solar racking system of claim 1, wherein each of said at least two substantially parallelly disposed panel support structures further comprises a plurality of rubber pads disposed on the bottom of each said bottom member to prevent skidding of each of said at least two substantially parallelly disposed panel support structures relative to a flat roof.

* * * * *